UNITED STATES PATENT OFFICE.

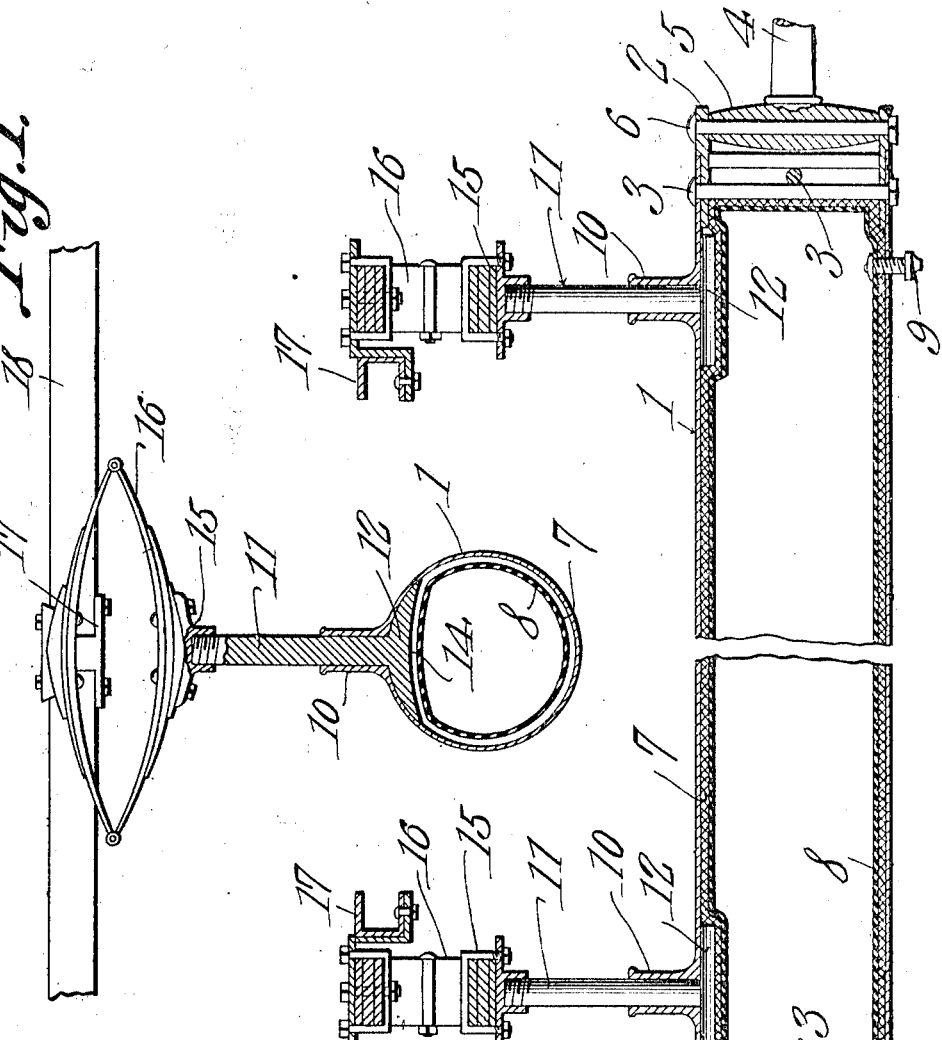
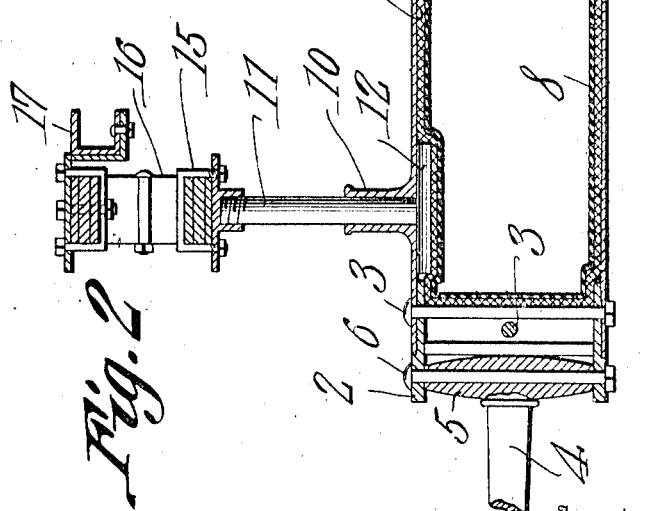

JEW GARLICK, OF PATERSON, NEW JERSEY.

FRONT AUTOMOBILE-AXLE.

965,288.  Specification of Letters Patent. Patented July 26, 1910.

Application filed January 26, 1910. Serial No. 540,229.

*To all whom it may concern:*

Be it known that I, JEW GARLICK, a citizen of the United States, residing at Paterson, in the county of Passaic and State of New Jersey, have invented a new and useful Front Automobile-Axle, of which the following is a specification.

It is the object of this invention, primarily, to construct a vehicle axle, having means housed within its contour, for supporting the body of the vehicle, thereby rendering pneumatic, or other resilient tires unnecessary.

Another object of the invention is to provide a vehicle axle adapted to house a resilient element constituting a support for the vehicle body, the portion of the axle thus serving as a housing, being adapted to constitute a mounting for the pivoted portions of the axle.

With the above and other objects in view, the invention consists in the novel construction and arrangement of parts hereinafter described, delineated in the drawings, and specifically claimed, it being understood that changes, properly falling within the scope of what is claimed, may be made, without departing from the spirit of the invention, or sacrificing any of the advantages thereof.

Similar numerals of reference are employed to denote corresponding parts throughout the several figures of the drawings.

In the drawings, Figure 1 shows my invention in transverse section, parts being shown in elevation; and Fig. 2 is a longitudinal section of the device, parts being shown in elevation.

In the drawings, an axle is shown, the same being of that type which is commonly employed upon the forward end of an automobile. The axle as thus constructed, comprises a cylinder 1, preferably, although not necessarily, fashioned from metal. Heads 2 are adapted to be inserted into the ends of the cylinder 1, the heads being secured in place by means of rectangularly disposed bolts 3, or other securing means, extended through the cylinder 1. The axle sections 4 are provided with enlarged heads 5, adapted to be mounted within the ends of the members 2, the heads 5 of the axle sections being pivotally connected with the heads 2, by means of bolts 6, or other connecting means adapted to a like end.

Located within the cylinder 1, is a tube 7, preferably fashioned from canvas, within which is located a resilient bag 8, preferably fashioned from rubber, a nipple 9, communicating with the interior of the bag, and located relatively near to one end of the cylinder 1, constituting a means for inflating the tube 7 and the bag 8.

Rising from the cylinder 1, adjacent the ends thereof, are upright tubular necks 10, in which reciprocate plungers 11, provided, at their lower ends, with feet 12, located between the cylinder 1 and the canvas tube 7, and adapted to bear upon the canvas tube, the lower surfaces of the feet 12, being curved, transversely of the cylinder 1, as denoted by the numeral 14 in Fig. 1, so that the feet 12 may bear throughout a relatively large area, upon the tube 7, without injuring the same. Secured to the upper ends of the plungers 11, are heads 15, of any desired construction, with which may, if desired, be assembled springs 16, the spring carrying brackets 17, of any desired construction, whereby the body 18 of the vehicle may be connected with the springs. It will be seen that by removing the bolts 3, one of the heads 2 may be removed, so that the cylindrical inflatable element comprising the members 7 and 8, may be terminally inserted into place within the cylinder 1.

Obviously, the weight of the vehicle will be carried downwardly, upon the plungers 11, which, reciprocating in the necks 10, will permit the feet 12 to bear upon the member 7, the member 7, being inflated to the desired degree, yielding under the weight of the vehicle body and its contents, so that the same will be resiliently supported, without resort to pneumatic, or other resilient tires upon the wheels of the vehicle.

It will be seen that the device is so constructed that the tubular elements 7 and 8 may be renewed without difficulty, and, when once in place, they may readily be pumped up through the nipple 9, from the exterior of the cylinder 1, without disturbing any of the constituent parts of the device.

Having thus described the invention, what is claimed is:—

In a device of the class described, a tubular vehicle axle; an inflatable bag adapted to be slid into the axle longitudinally of the axle; spaced body-supporting members disposed transversely of the axle and individually slidable therein to bear upon the bag; and removable closures for the ends of the axle; the axle being adapted to inclose the bag closely between the said members.

In testimony that I claim the foregoing as my own, I have hereto affixed my signature in the presence of two witnesses.

JEW GARLICK.

Witnesses:
C. E. DOYLE,
GEO. B. PITTS.